US011636880B2

(12) United States Patent
Hendry et al.

(10) Patent No.: US 11,636,880 B2
(45) Date of Patent: Apr. 25, 2023

(54) SYSTEM AND METHOD FOR EVENT DATA COLLECTION AND VIDEO ALIGNMENT

(71) Applicant: ScoreBreak, LLC, Denver, CO (US)

(72) Inventors: Jordan Hendry, Denver, CO (US); Michael Hendry, Golden, CO (US)

(73) Assignee: Scorebreak, LLC, Denver, CO (US)

( * ) Notice: Subject to any disclaimer, the term of this patent is extended or adjusted under 35 U.S.C. 154(b) by 72 days.

(21) Appl. No.: 17/145,099

(22) Filed: Jan. 8, 2021

(65) Prior Publication Data

US 2021/0134329 A1    May 6, 2021

Related U.S. Application Data

(62) Division of application No. 15/211,852, filed on Jul. 15, 2016, now Pat. No. 10,923,157.

(Continued)

(51) Int. Cl.
| | | |
|---|---|---|
| *H04N 9/80* | (2006.01) | |
| *G11B 27/10* | (2006.01) | |
| *H04N 5/92* | (2006.01) | |
| *G11B 27/34* | (2006.01) | |
| *H04N 21/8547* | (2011.01) | |
| *H04N 21/845* | (2011.01) | |
| *H04N 21/81* | (2011.01) | |
| *H04N 21/8352* | (2011.01) | |
| *H04N 21/431* | (2011.01) | |
| *G06F 16/738* | (2019.01) | |
| *G06F 16/78* | (2019.01) | |
| *H04N 5/76* | (2006.01) | |
| *H04N 9/82* | (2006.01) | |
| *G11B 27/28* | (2006.01) | |
| *G11B 27/30* | (2006.01) | |
| *H04N 21/258* | (2011.01) | |
| *H04N 21/2543* | (2011.01) | |
| *H04N 5/93* | (2006.01) | |
| *G11B 27/00* | (2006.01) | |

(52) U.S. Cl.
CPC .......... *G11B 27/105* (2013.01); *G06F 16/738* (2019.01); *G06F 16/7867* (2019.01); *G11B 27/28* (2013.01); *G11B 27/3036* (2013.01); *G11B 27/34* (2013.01); *H04N 5/76* (2013.01); *H04N 5/9201* (2013.01); *H04N 9/8205* (2013.01); *H04N 21/25435* (2013.01); *H04N 21/25808* (2013.01); *H04N 21/431* (2013.01); *H04N 21/8133* (2013.01); *H04N 21/8352* (2013.01); *H04N 21/8456* (2013.01); *H04N 21/8547* (2013.01)

(58) Field of Classification Search
USPC .................................................. 386/241, 248
See application file for complete search history.

(56) References Cited

U.S. PATENT DOCUMENTS 9,113,193 B1 * 8/2015 Gardes ............... H04N 21/4113
2010/0278509 A1 * 11/2010 Nagano .................. G11B 27/34
386/230

(Continued)

*Primary Examiner* — Nigar Chowdhury
(74) *Attorney, Agent, or Firm* — Glenn H. Lenzen; Elevated IP, LLC

(57) ABSTRACT

Software is provided to collect events that transpire during an event. Captured video of the event can then be aligned to the events by calculating an offset between timestamps provided by the devices used to capture the action data and film data. A video clip can be sourced to review events that occurred.

8 Claims, 6 Drawing Sheets

Related U.S. Application Data

(60) Provisional application No. 62/193,948, filed on Jul. 17, 2015.

(56) References Cited

U.S. PATENT DOCUMENTS

| | | | |
|---|---|---|---|
| 2015/0235256 A1* | 8/2015 | Barsoum | G06Q 20/02 705/14.33 |
| 2015/0235275 A1* | 8/2015 | Shah | G06Q 30/0269 705/14.66 |
| 2015/0318015 A1* | 11/2015 | Bose | A63F 13/828 386/248 |
| 2016/0307335 A1* | 10/2016 | Perry | H04N 5/23229 |

\* cited by examiner

SYSTEM AND METHOD FOR EVENT DATA COLLECTION AND VIDEO ALIGNMENT

CROSS-REFERENCE TO RELATED APPLICATIONS

This application is a divisional patent application of U.S. patent application Ser. No. 15/211,852, filed on Jul. 15, 2016, which claims the benefit of U.S. Provisional Patent Application Ser. No. 62/193,948, filed on Jul. 17, 2015, the entire disclosures of which are incorporated herein by reference.

FIELD OF THE INVENTION

The present invention relates generally to data processing. More specifically, the present invention relates to a system and method for collection, statistical video recording and selective playback of event video data.

BACKGROUND

Traditional athletic data collection systems and video review systems operate independently of one another. Data collection systems maintain a record of events having occurred in a contest, while video of the athletic event is captured independent of statistical recording processes.

Such traditional athletic data collection systems allow an operator to record events of an athletic contest for the purpose of creating a statistical recording. In traditional systems, the operator must manually code the events using a data-entry system that provides little context-sensitive adaptation of options. This lack of context can lead to incorrect data entry due to a lack of logic enforcement.

Reviewing captured video for analysis is optimized through segmentation processes in which game film is organized into categories. Video segmentation is a technique that segments video data for jumping to a specific playback position within a video and subsequently allowing video to be played back from specified playback positions. One particular conventional sports video segmentation technique uses a video processing system to allow an operator to "tag" a video stream of a sporting event with event data. Correlation of the data to individual video frames allows for searching, retrieval, and viewing of video clip(s) for specific events that occurred during the sporting event or athletic contest.

Such video segmentation systems are executed independently of game administration operations, including the scoring of the game, requiring additional resources to be dedicated to the tagging of the video stream. Tagging occurs either during the game or after the contest has concluded. This task is time consuming, and only in exemplary embodiments are timely results provided. Further, traditional video segmentation systems utilize resource intensive computing practices, increasing costs and complexity. Further still, this practice lacks integration of the events having occurred, as recorded through the statistics, leading to duplication of work.

SUMMARY OF THE INVENTION

To address the above-discussed deficiencies of the prior art, the disadvantages and problems associated with prior data collection and video processing systems have been reduced or eliminated through the advantages listed below.

Data processing methods are provided which include defining situational context for a plurality of event-related situations, searching for context-matching events in a database, locating required data points for assessment, and compiling defined data points into a graphical user interface representing the inputs in accordance with certain embodiments.

In another embodiment, other data processing methods are provided which include receiving assessed event data from any statistical recording program for a plurality of data points, recording defined inputs in a database, inferring additional recordable data and recording the data in a database.

In yet another embodiment, video processing methods are provided which include correlating video data with recorded event data by calculating an offset time between timestamps found within metadata of video and event data files, and recording the result in a database.

In still another embodiment, other video processing methods are provided which include receiving a query to retrieve a segment of a video for each of a plurality of events, searching for event data in a database, defining the event timestamp for each of the plurality of events, calculating the video playback times for each of the plurality of events, and compiling resulting data to form a compiled video stream lacking durations of video which do not satisfy the query.

In certain embodiments, a system for processing video and information is provided which includes a processor and memory to recall and display a progressively refined set of possible actions and outcomes relating to the current situation of a defined event, with these selections forming a data stream. Event data streams, whether or not created through the aforementioned system, may be received and stored by the memory, along with a digital video data file containing footage of the event. The processor may calculate and store an offset time representing the difference between system times of devices used to record the at least one event data feed and the at least one digital video data file. The processor may define a duration of the video to display via a graphical user interface to show actions that happened during the event.

The embodiments of the present disclosure provide various technical advantages. One advantage is that the data collection methods may present the only possible actions that could occur at a given point in an athletic match. The methods may recognize the current state of an athletic contest and provide a curated list of available actions in order to expedite data input. Further, the system may infer and record additional statistics without an end user's input. This recorded data is used for the reporting of game statistics to governing bodies and media outlets. Another advantage is that the video processing system may then synchronize collected event data with video recordings of that event. The system may synchronize the event data with the video based on independent time stamps found in the metadata of both video files and event data files. By synchronizing an event's data stream with recorded video, the system can index the video feed, thereby providing customized video clips. Through selection of statistical data in a graphical display, an end user may interact with a box score, play-by-play, or other game report to invoke playback of associated video segments. This system and method liberate resources previously dedicated to associated tasks now automated.

Other advantages of the present invention will be readily apparent to one skilled in the art from the description and the appended claims.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitable arranged data collection and video processing systems. In the following description, detailed descriptions of well-known functions, configurations, or systems will be omitted since they would unnecessarily obscure the subject matter of the various embodiments of the present disclosure. Terms used herein must be understood based on the descriptions made herein.

Hereinafter, systems and methods for collecting, processing, and correlating event data will be described according to embodiments of the present invention.

Figure 1:
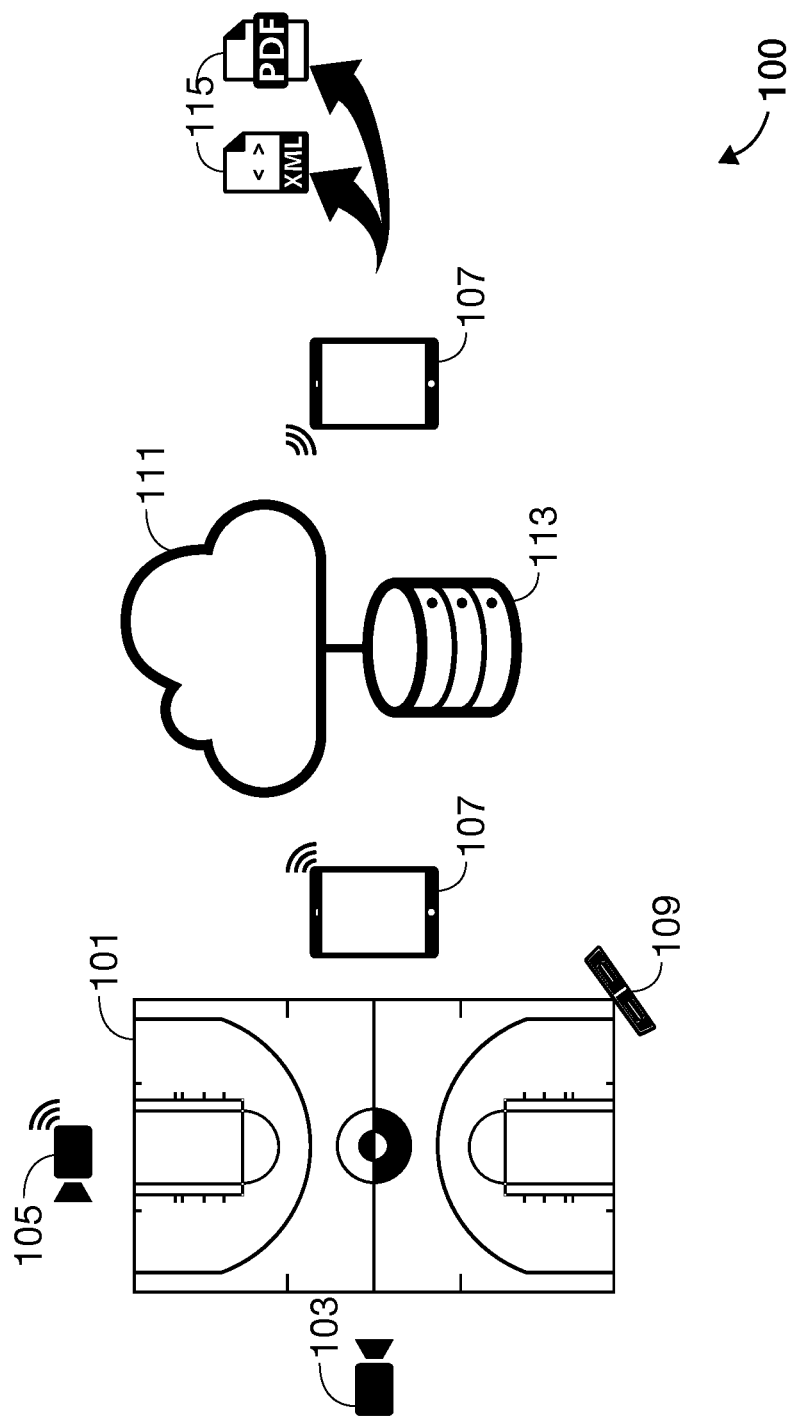
FIG. 1 illustrates a data collection and video processing system.

FIG. 1 illustrates a data collection and video processing system 100 according to an embodiment of the present invention. The system is generally able to receive or transmit data associated with an event 101 via computing portals 107. An event's record of statistics and actions make up an event data set, with each record being contained in an extensible file format. The system may receive event data to locally networked systems 109 in addition to remotely networked 111 computational and storage systems 113 via computational transmission standards 115. Video data recorded using one or more suitable image capture devices 103, including Internet connected video recording devices 105, can be uploaded directly to local computing portals or made available via upload to remote systems.

Client computing terminals may run processes and methods of the present invention, allowing for event data collection and alignment of event data to recorded event video data streams without requiring a networked connection. Event data collection methods are further described in FIGS. 2 and 3. Video data alignment to event data methods are further described in FIGS. 4 and 6. Optionally, remote computing terminals can provide these functions, transmitting any called resource on demand. Thus, the system may allow an end-user to interact with video indexed with recorded data streams that occurred during the event.

Referring again to FIG. 1, events 101 can include any suitable contest, game, or other activity in which actions executed within the event are able to be recorded. Each event may comprise a plurality of actions that can be recorded in linguistic and video-based formats. Linguistic formatting includes recording actions occurring in the event into an event data stream. Examples include statistics and play-by-play accounts of transpired events in either written, coded, or spoken formatting. Video-based formats include three-dimensional modeling, multi-camera recording, digital video recording, or other AV recording formats.

Computing portals 107 may comprise any suitable combination of hardware and/or software to provide intended computing functionality. Locally networked systems 109 may include digital scoreboards, signage, information systems, or other networked computational entities. Remote networks 111, commonly 'cloud computing' systems, may be used to provide external processing, hosting, and distribution processes for accessing, synchronizing, or otherwise interacting with non-local computations and storage elements 113. Transfer of digital data and content may occur via digital data communication protocols.

Non-network enabled image capture devices 103 must upload recorded video data to local devices in order to make available captured video data streams. Internet-enabled video recording devices 105 are considered capable of executing computational processes to stream or otherwise upload data to local or remote networks.

Figure 2:
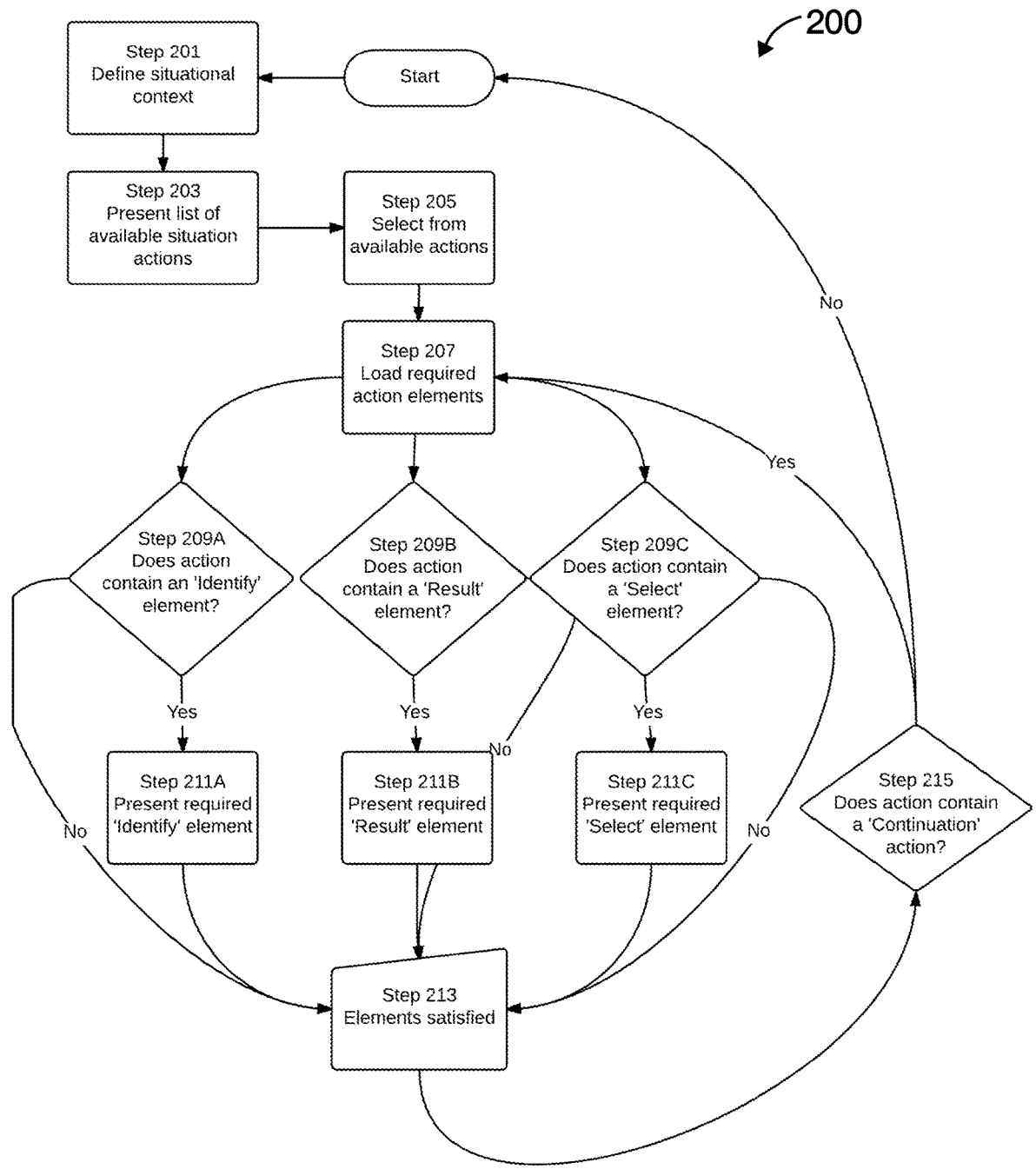
FIG. 2 is a flow diagram of a process for assessing event data and sourcing additional event actions for assessment.
Figure 3:
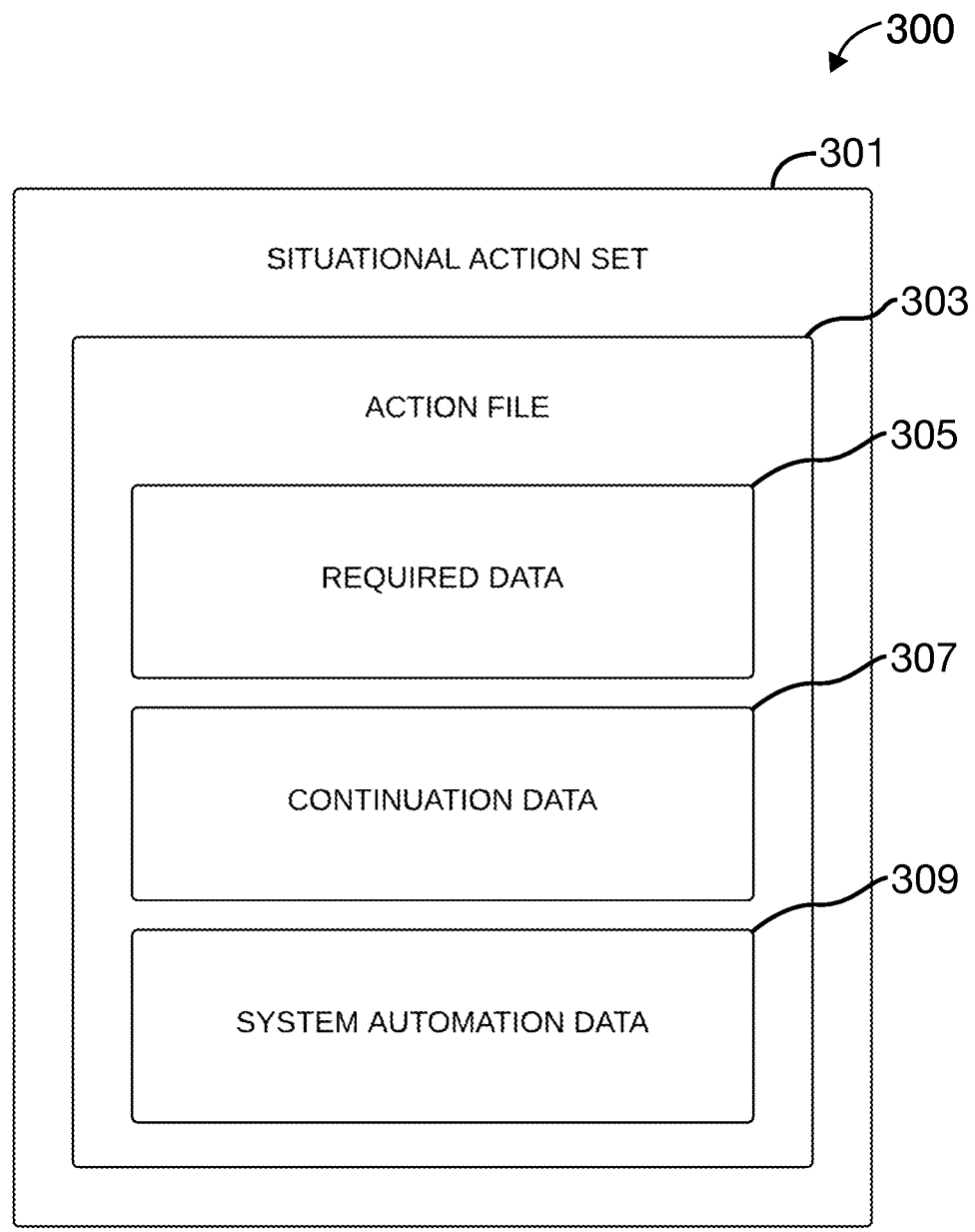
FIG. 3 illustrates an example format of event data used in assessment of event actions.

FIG. 2 is a flow diagram of a process 200 for assessing event data and sourcing additional event actions for assessment. The event's current situation is analyzed according to data points including event state (e.g. pre-event; delayed situation, etc.), and time (201). A situation action set is presented in accordance with an event's defined context (203). A defined set of event actions make up a situation action set, with each event action having an action file (FIG. 3).

An end-user is able to select the corresponding event action representing an action transpiring during the course of the event (205). Defining an action invokes the invention to retrieve the corresponding action file from a local database of available event actions (207) and process the action file's logic.

In certain embodiments, required action elements include defining the identity of the person, persons, group, or team causing the action to have occurred (209A, 211A). Similarly data regarding the result of the action (209B, 211B) and traits of the action (209C, 211C) may be presented for assessment. In certain embodiments, the action file may require an additional action file be loaded in the form of a 'continuation' action following the satisfaction of the current action file's requirements (213, 215).

Additional traits and processes may be automated for the end-user including clock management, scoring, statistical recordings, and fulfillment of additional data points through the logic contained within action files. This process supplies an automated looping-mechanism to continually provide focused, manageable lists of available actions and data inputs for any situation in an event.

Referring now to FIG. 3, an example format 300 of event data used in assessment of event actions is depicted. A situational action set (301) is called in accordance with the defined event's current situation (FIG. 2). This action set provides all available actions (303) that can be assessed at this current situation. An action file is provided for each of the available actions in an event, with some action files not being made available to the end-user, thus providing the system a method of automation. The file defines required data elements for assessing the action, gathering additional data, and providing instructions to the data collection system.

When an action is selected, its corresponding file is read, providing the system's process with action data requirements (305), continuation data (307), and additional system automation instructions (309). Action data requirements provide data to execute steps 209A-C and 211A-C; continuation data for steps 213 and 215; and additional system automation instructions for initializing scripted actions as described in FIGS. 2 and 6. Included are action lead and lag times, which together provide the system a duration value enabling video clip playback.

Figure 4:
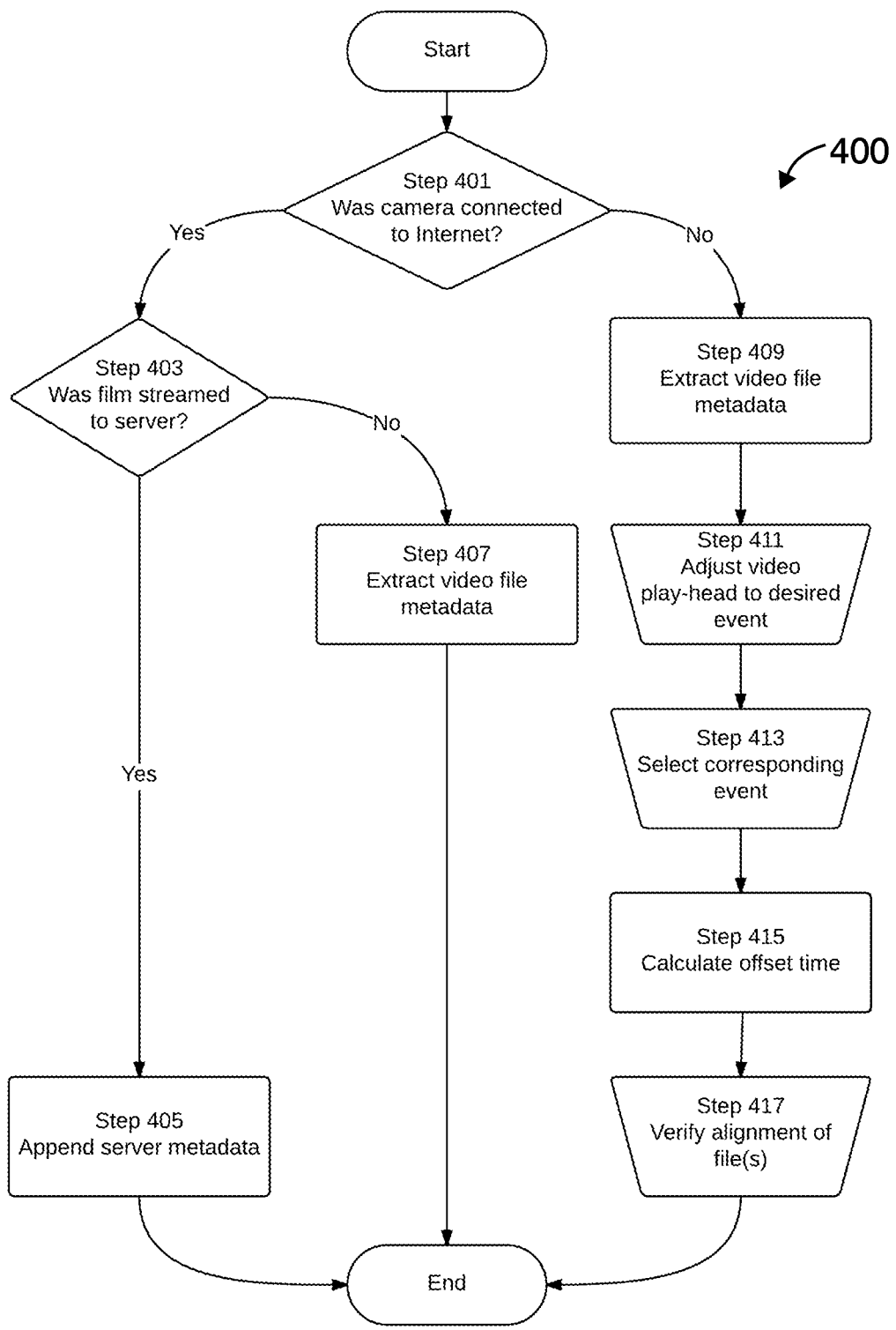
FIG. 4 is a flow diagram of a process for aligning a video data stream to an event data stream.

FIG. 4 is a flow diagram of a process 400 for aligning a video data stream to an event data stream. This process allows for event data collected either via process 200 of system 100, or from an outside process, to automatically calculate playback times of events found within associated event video. Segmenting the video stream of an event allows any recorded event action a corresponding AV clip, or video clips in the event of multiple video feeds. This process is also referred to as "indexing" the video feed with recorded event data.

Figure 5:
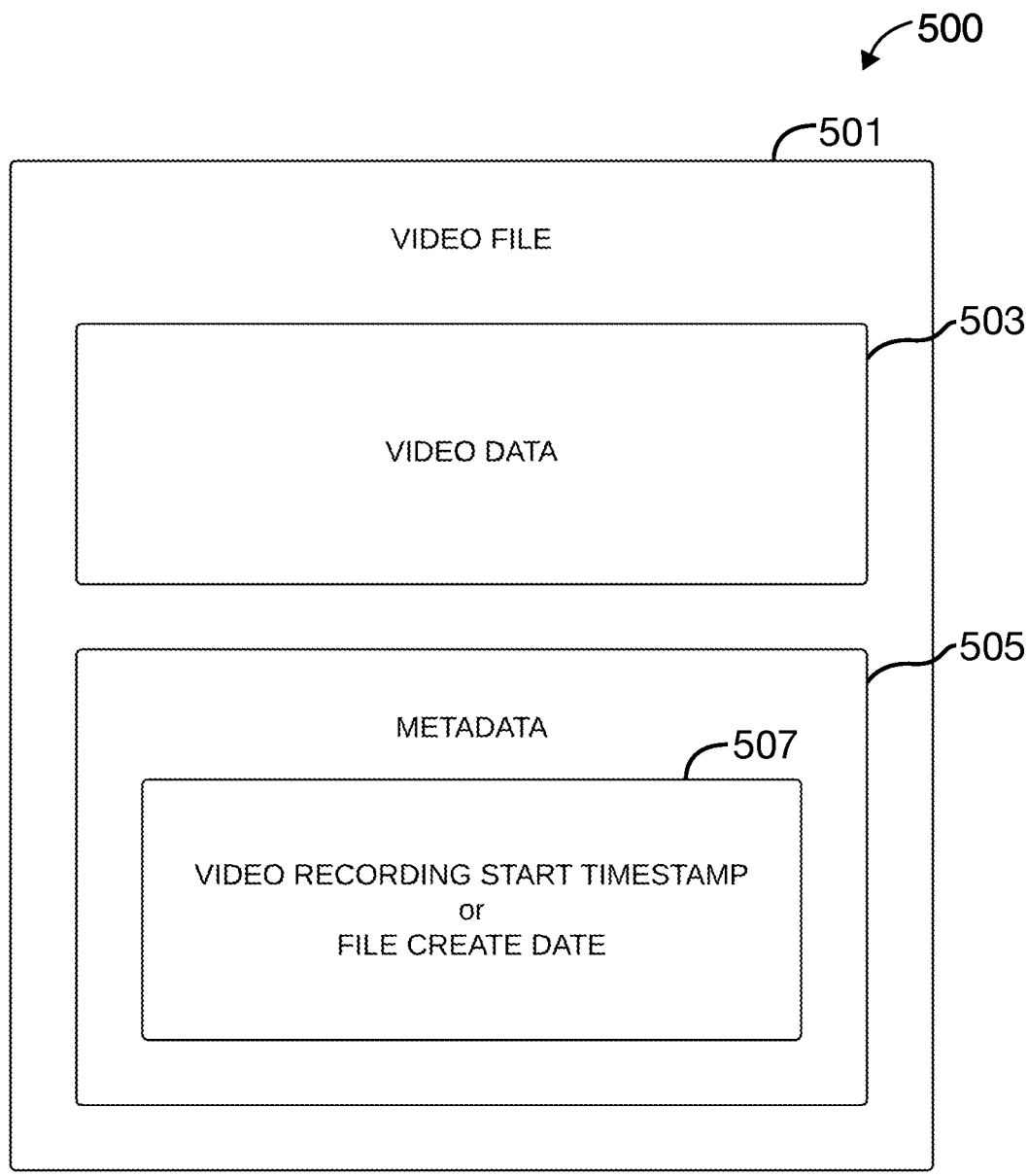
FIG. 5 illustrates an example format of video data.

The level of automation achieved in this process is directly associated with the technology available to the device filming the event. At a minimum, the invention requires the digital recording device to append metadata to new video files. As one example, which is illustrated in FIG. 5, the time of recording start (or file creation) of the corresponding video data may be stored in a metadata format in the metadata (505) storage space within the video file (501) configured with the video data (503). That is, the time at which the recording began, according to the camera itself (or the camera's Internet connected sources), may be stored separately from the video data within the corresponding video data.

Although the file alignment process can be fully automated with use of Internet connected digital video recorders, many digital recording devices lack this network connection. During alignment of event data to video recorded from a non-Internet enabled recording device, the video file metadata is extracted (409), allowing process 400 to store this initial value for use in a later computation to define an event-data to video-recording offset time. A manual operation of setting the video play-head to an action that was recorded in the events data stream (411) and selecting this corresponding action from a list (413) can be used to provide other data values needed in executing the aforementioned calculation (415).

Using the defined offset time as an alignment structure, any action inputted while assessing event data (FIG. 2) may have a corresponding video clip sourced; the only requirement being that the camera was recording video of the event during that time.

The same offset value can be used to correlate multiple video files from the same camera. To ensure the video file(s) align correctly with an event's actions, a randomly selected action may be displayed with a description of the matching action (417).

Recording devices capable of being connected to the Internet, or connected to a computer with an active Internet connection, may enable a fully-automated film alignment process. In the case of live-streamed video, the remote server will append its own timestamp, enabling offset time calculations to be made (403). Alternatively, if the video files were not live-streamed but did come from a camera with a known internet connection (401), the metadata can be a trusted source and offset calculations may be made. Trust is enabled on video recording of an Internet connected device because events are scored using computers that have had contact or are actively connected to the Internet. This provides a "balancing of the scales"; i.e., the metadata in both file formats provide indications to set time zones, allowing a conversion to common conversion time-code and an offset of zero.

Figure 6:
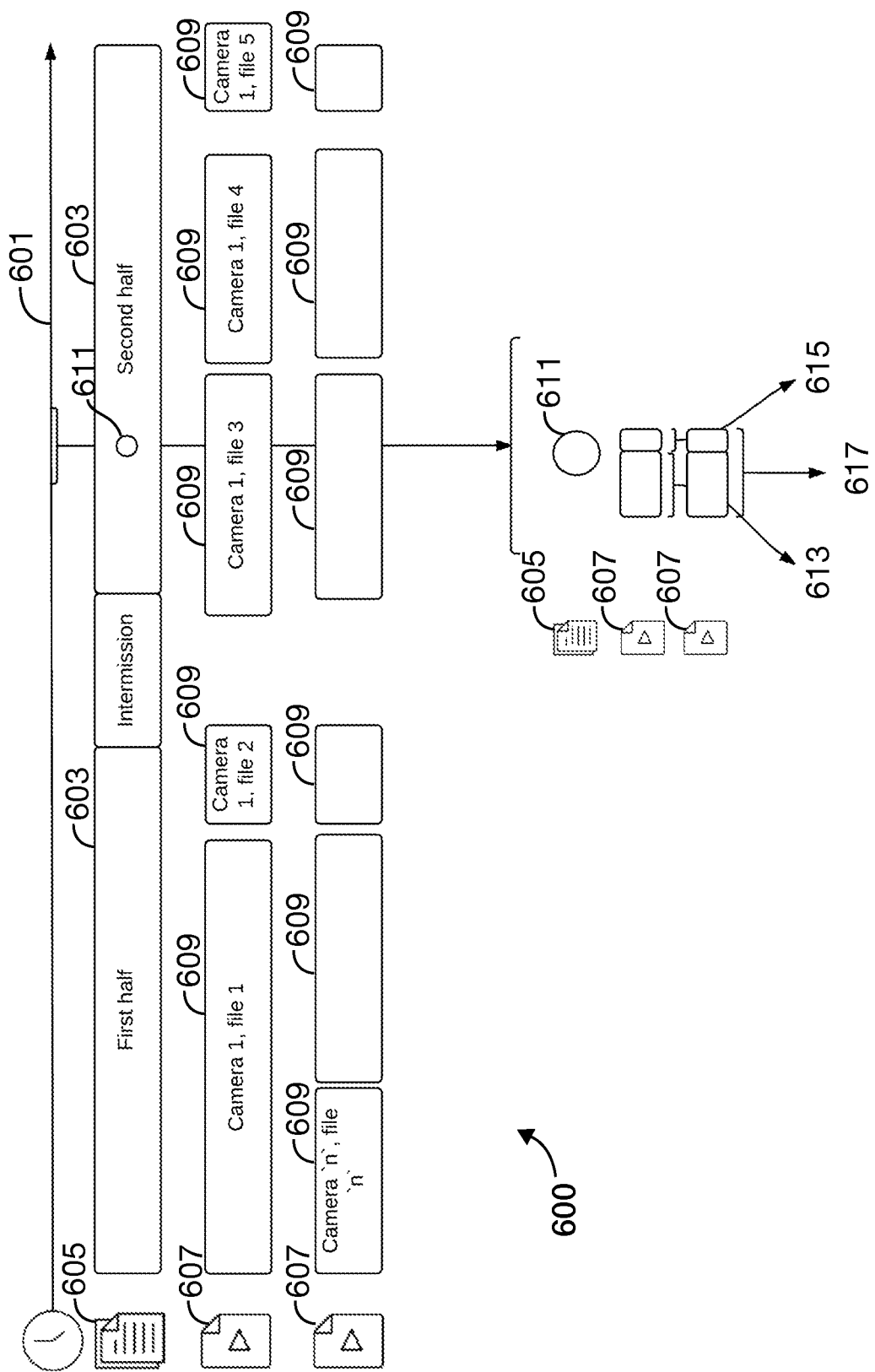
FIG. 6 illustrates an example format of event data aligned with video data streams captured during the event, and provides an example process to generate a video clip.

FIG. 6 illustrates an example format 600 of event data aligned with video data streams captured during an event, and provides an example process to generate a video clip. This format provides a visual representation of process 400, in which a video taken during an event is aligned with actions that were recorded during the event via a defined offset time. Time (601) is represented on the x-axis, allowing one to see a multitude of a camera's (607) video files (609) aligned an event's data stream (605) file's (603) and actions (611).

Several reasons exist for multiple video files being generated per camera. These include, by way of example, a camera operator not recording during event intermissions or stoppages (such as a timeout in an athletic event).

In a multi-camera recording set up, it is possible that only one of the cameras was recording during the action event time. Likewise, it is possible that none of the events-available cameras were recording during an event. Further, It is possible to define a situation where a large number of cameras, each containing independent offset times, were recording when an action (611) occurred in an event, and where the corresponding event was recorded in the event data stream (605). An action's defaulted lead time (613) and lag time (615) are components of the associated action's action file (300) system automation data (309). An end-user may edit the lead and/or lag time of an individual action inside an events data stream in order to adjust a clip's playback length (617). Likewise, an end-user may adjust the time associated with the event in order to adjust for an error made during the recording of event data.

Clip playback location and duration are determinable by action time, video-to-data offset value, and action lead/lag parameters. Simple arithmetic allows for instructions for returning a portion of the video data containing the action event:

$$\text{actionClipPlaybackStartTime} = \text{action Time} - \text{offsetValue} - \text{actionLeadTime} \quad (\text{eq.1})$$

$$\text{actionClipEndTime} = \text{action Time} - \text{offsetValue} + \text{actionLagTime} \quad (\text{eq. 2})$$

$$\text{actionClipDuration} = \text{actionLeadTime} + \text{actionLagTime} \quad (\text{eq.3})$$

The methodology of the present invention and one or more of the functional operations described in this specification can be implemented in digital electronic circuitry, or in computer software, firmware, or hardware, including the structural means herein disclosed and structural equivalents thereof, or in combinations thereof. The system of the present invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs of data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

Some processes and logic flows described in this specification, including the method steps of the invention, can be performed by one or more programmable processors executing one or more computer programs to perform functions of the invention by operating on input data and generating output. The process and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., optical disks or solid state disks. Information carriers suitable for embodying computer program instructions and data include all forms of non-volatile memory, including by way of example semiconductor memory devices, e.g., flash memory devices. The processor and the memory can be supplemented by, or incorporated in, special purpose logic circuitry.

To provide for interaction with a user, the invention can be implemented on a computer having a display device, e.g., a LCD (liquid crystal display) screen, for displaying information to the user and an input device, e.g., a touchscreen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implanted in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a LAN (local area network) and a WAN (wide area network), e.g., the Internet.

The computing system may include clients and servers. A client and server are generally remote from each other and typically interact through a communication network. The relationship of client and server arises by virtue of computer programs running on the respective computers of each and having a client-server relationship with respect to one other.

A number of implementations have been described. Nevertheless, it will be understood that various modifications may be made without affecting the scope of the present invention. For example, certain operations of the techniques can be performed in parallel or in a different order than is depicted and described. In addition, the described techniques can be used in connection with performing other types of processing on data and video sequences. Accordingly, other implementations are within the scope the following claims.

What is claimed is:

1. A method for processing information and digital video, the method comprising:
   receiving a request to view the recorded actions of a specific event;
   searching for the specific event in a database comprised of at least an actions data table and a films data table stored in a local or remote memory medium, wherein the films data table contains data fields for referencing locations of video data feeds stored in local and/or remote storage mediums, unique event IDs of events represented by recordings, recording start or file creation time-stamps, film durations, and offset-times representing the difference in time between the system times of devices used for recording actions and digital video;
   retrieving and displaying at least one data feed associated with the requested event from the data table;
   receiving a request for a selection of actions having associated video available;
   determining the location of video file(s) for playback and calculating playback start time and duration; and
   displaying the generated playback via a controlling computer's graphical user interface.

2. The method of claim 1, wherein the request originates from an end user.

3. The method of claim 1, wherein the actions data table contains data fields for actions that occur in an event, unique IDs of the events in which the actions occur, and for system time-stamps corresponding to the actions.

4. The method of claim 3, wherein the actions data table further comprises additional data fields for adjusted playback lead and lag times.

5. The method of claim 3, wherein the actions from the at least one data feed are displayed by a controlling computer's graphical user interface.

6. The method of claim 1, wherein playback start time and duration is calculated based on action-defined lead and lag times when a custom lead and/or lag time are not stored in the associated action data table reference.

7. A system for processing video and information, comprising:
   at least one processor and memory including means for displaying via a graphical user interface a progressively refined set of possible actions and outcomes selected from an event's current specified event-state;
   means for receiving and storing at least one event data feed comprising event actions and outcomes which occurred during the event;
   means for receiving and storing at least one digital video data file containing footage of at least one event action having transpired during the event;
   means for calculating and storing an offset time representing the difference between system times of devices used to record the at least one event data feed and the at least one digital video data file; and means for displaying via a graphical user interface video clips of the correlated actions that happened during the event.

8. The system of claim 7, wherein the calculation aligns the film file to a scored action, manually or by trusted timestamp.

\* \* \* \* \*